United States Patent [19]

Luscher

[11] 3,848,200

[45] Nov. 12, 1974

[54] ASSEMBLY COMPRISING A QUARTZ OSCILLATOR DELIVERING TWO-PHASE PERIODIC SIGNALS AND A DIVIDER FOR THE FREQUENCY OF SAID SIGNALS

[76] Inventor: Jakob Luscher, 20b Route de Drize, Carouge/Geneve, Switzerland

[22] Filed: July 20, 1973

[21] Appl. No.: 380,970

[30] Foreign Application Priority Data

July 21, 1972 Switzerland........................ 10985/72

[52] U.S. Cl................................. 331/51, 331/116 R

[51] Int. Cl............................................. H03b 5/36

[58] Field of Search........................ 331/116, 159, 51

*Primary Examiner*—John Kominski

*Attorney, Agent, or Firm*—Hubbell, Cohen, & Stiefel

[57] ABSTRACT

An assembly comprising a quartz oscillator which delivers two-phase periodic signals and a divider for the frequency of said signals.

2 Claims, 14 Drawing Figures

ASSEMBLY COMPRISING A QUARTZ OSCILLATOR DELIVERING TWO-PHASE PERIODIC SIGNALS AND A DIVIDER FOR THE FREQUENCY OF SAID SIGNALS

One of the main objectives of the invention is to permit the providing of an assembly of this type whose consumpton is particularly low, for instance, of the order of a few microwatts, this assembly being capable under these conditions of being used by all types of battery-fed portable devices or apparatus of small dimensions which, although of very low energy capacity is called upon to assure the feeding of the assembly in question continuously over several months or even a year or more.

As is known, the energy dissipated in an oscillator-divider assembly is, to the greater part, dissipated in the divider, particularly when the frequency to be divided and the rate of division which are desired are particularly high, which is true for instance, when said frequency is of the order of several megacycles and the signal coming from the divider is to have a relatively low frequency.

Practically uniformly it has been proposed to obviate this drawback by producing the electronic compenents of the divider by an integrated circuit technique.

Now if it is desired to produce a frequency divider in entirely integrated form, capable of dividing a periodic signal of very high frequency (for example, a few megacycles) and consuming only a few $\mu$W, while being fed by a source of low voltage (for instance, a mercuric oxide battery providing a voltage of 1.3 V), very great difficulties are at present encountered. Solutions are known in which use is made of hybrid circuits with transformers, for instance, (see, for instance Swiss Patent 514879). However, in order to obtain a very economical solution it is highly desirable that it be possible to make the divider circuit completely in integrated form. It has already been attempted on several occasions to solve this problem with complementary transistor circuits and in particular with field-effect transistors with insulated control electrode. It is well known that the processes necessary for producing complementary transistors on one and the same crystal are complicated and difficult to control in this case, since the requirements mentioned above make it necessary for the two types of transistors to have a very low threshold voltage whose value must be established with relatively small tolerances. Since the slope/input capacitance ratio of a transistor of "P" type is three times less than the corresponding ratio of a transistor of "N" type, it is the transistor of P type which limits the performance of such a circuit. It would be necessary, as a matter of fact, to manufacture such a divider in unusually small dimensions, which would make it very expensive in the present state of the art.

Another objective of the present invention is therefore to provide a divider which makes it possible to avoid the difficulties mentioned while satisfying the above-mentioned requirements, which can be produced entirely in integrated form while containing only a single type of Mos transistors—and therefore preferably of N type—which transistors can be produced in relatively large dimensions.

For the above purposes, the assembly in accordance with the invention is characterized by the fact that the divider is formed of a shift register which is integrated form and comprises a plurality of links connected one behind the other, the first of which is arranged behind the last so as to form a closed loop, these links being controlled by the said oscillator alternately from the two outputs thereof, by the fact that the oscillator and the register are coupled to each other in such a manner that the input capacitance of the register constitutes a part of the capacitive charge of the said oscillator, and finally, by the fact that it comprises, arranged at least at one point of the said closed loop, means for forming a signal which is characteristic of the passage at this point of any electric charge whose value is at least equal to a predetermined lower value, means for increasing the value of such a charge up to a ceiling value, and means for keeping away from said endless loop any charge whose value does not reach said predetermined lower value, the said assembly furthermore comprising means for polarizing the crystal, in which the compenents of the said register are integrated.

Other characteristics and details of the present invention will become evident from the following description read with reference to the accompanying drawings which are given by way of illustration and in which.

Figures 5A, 5B:
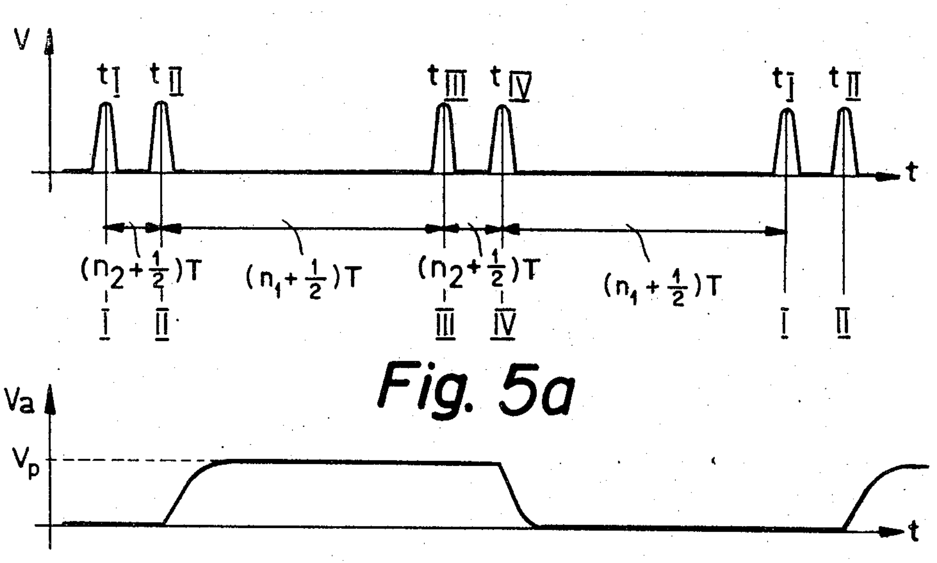

FIGS. 5*a* and 5*b* are explanatory graphs.

Figure 6:
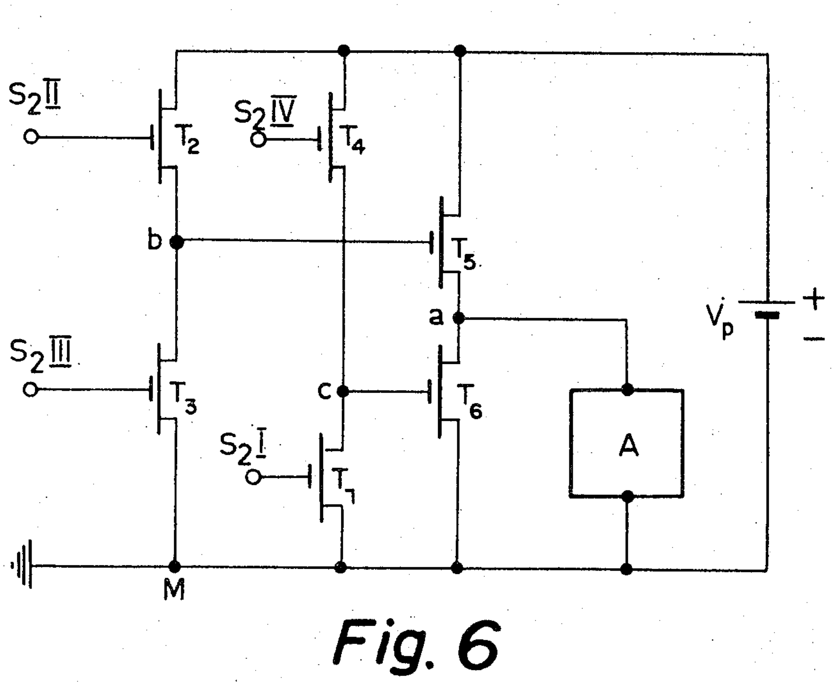

FIG. 6 shows the diagram of an auxiliary circuit.

Figure 7:
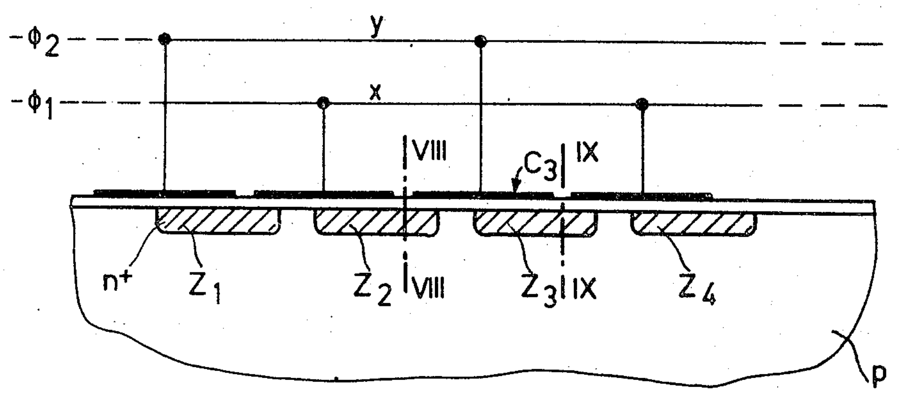

FIG. 7 is a schematic section, on a very large scale, of a part of the shift register which is used in the assembly according to the invention.

Figure 4:
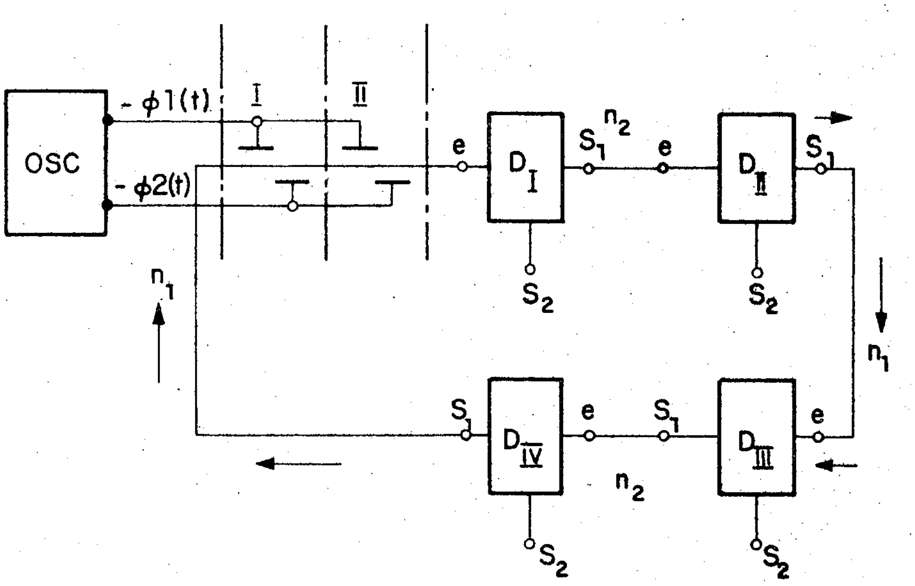
FIG. 4 shows the basic diagram of an embodiment of a divider in accordance with the invention.
Figure 8:
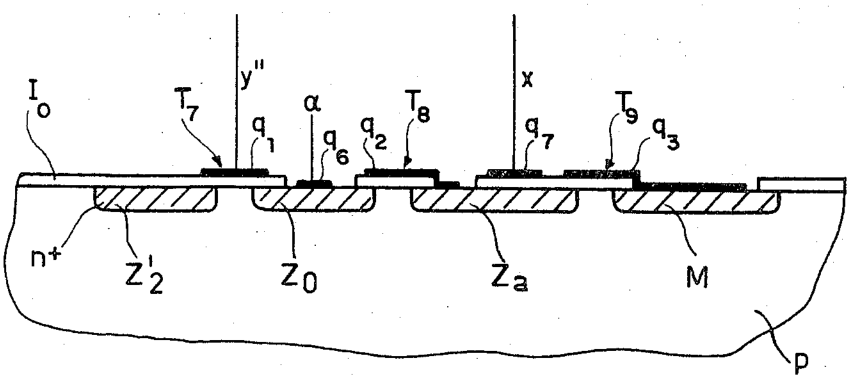
Figure 9:
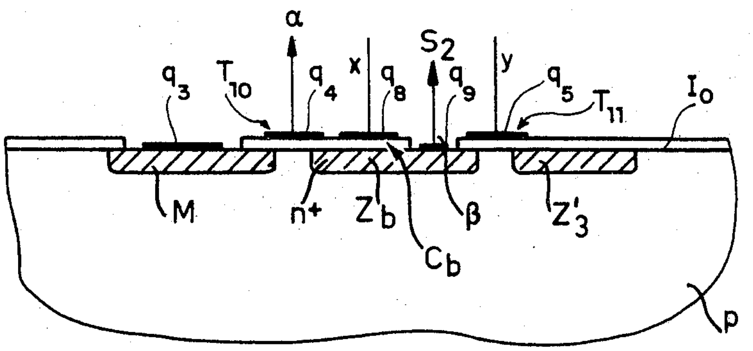

FIGS. 8 and 9 are two schematic sections taken along secant planes, the traces of which, in the plane of FIG. 7, are indicated by the axes VIII—VIII and IX—IX and which represent the elements of one of the devices $D_I$ to $D_{IV}$ illustrated in FIG. 4.

Figure 10:
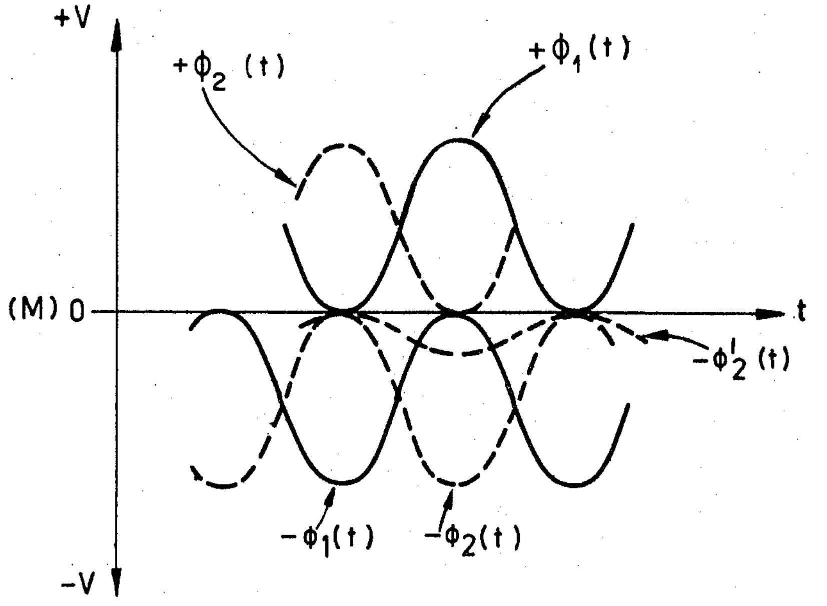
Figure 11:
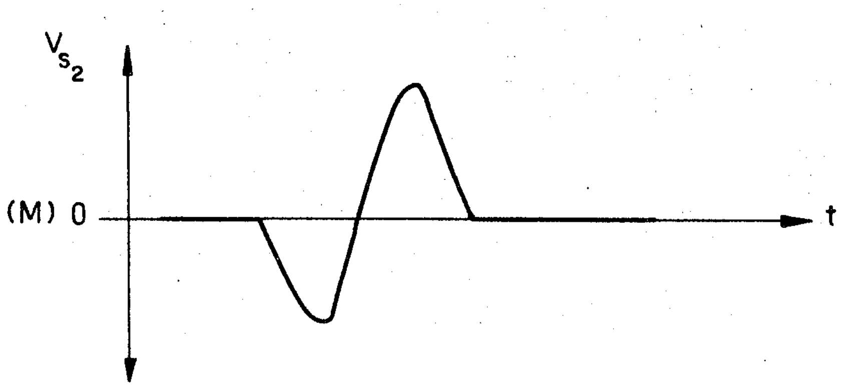

FIGS. 10 and 11 show two other explanatory graphs.

Figure 12:
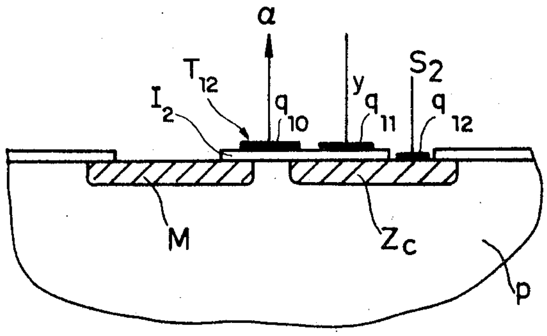

FIG. 12 shows—in the form of a schematic section—the elements of a variant detail of the assembly shown in FIGS. 8 and 9.

Figure 13:
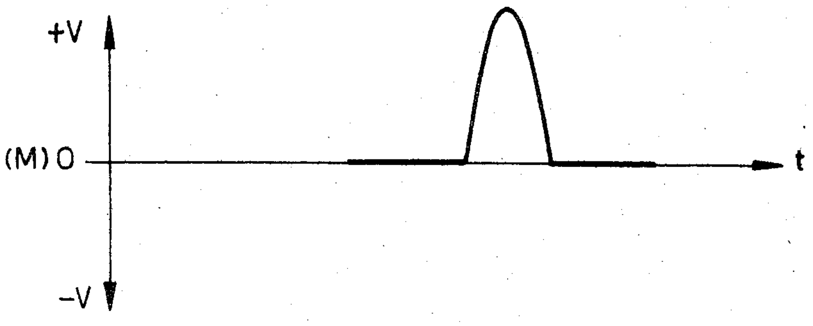

FIG. 13 is a graph.

Figure 1:
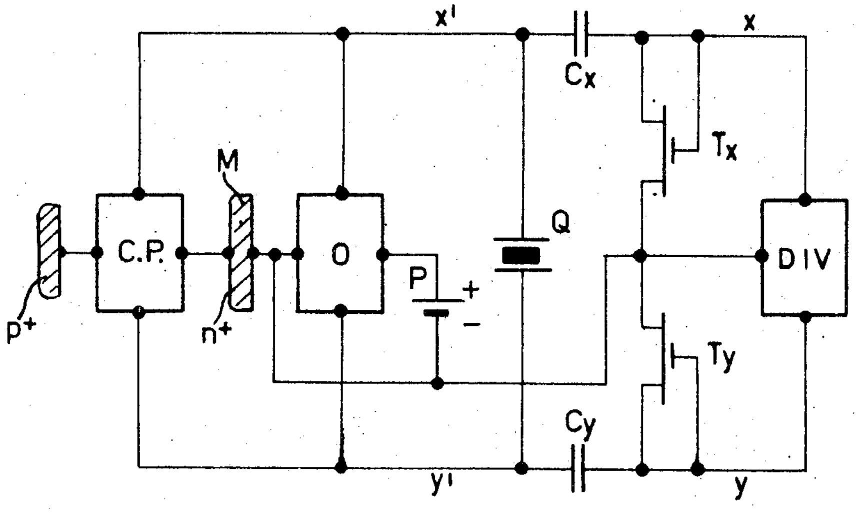
FIG. 1 is a diagram representing one embodiment of the assembly in accordance with the invention.

The assembly shown in FIG. 1 comprises a symmetrical oscillator comprising a quartz Q and an electronic sustaining circuit O which will preferably be developed in integrated form and whose structure may, for instance, be that of one of the oscillators described in the patent application published in France on March 10, 1972 and registered under No. 71.25878. The two outputs of the circuit O and the two electrodes of the quartz Q are connected to lines $x'$ and $y'$ respectively, on which there appear two periodic voltages in phase opposition which we will call $\phi_1$ and $\phi_2$ as soon as the circuit O is fed by a battery P which is connected to said circuit, via its positive terminal, and to ground M by its negative terminal.

If the circuit O is made in a crystal of $p$ type, which crystal is represented schematically by a hatched zone $p^+$, the ground M will advantageously be formed by a zone of $n^+$ type integrated in this crystal.

The circuit O, which could be developed by recourse to transistors of any type, is assumed here to include only transistors of the same type and in particular insulated gate field-effect transistors. In this case it is highly desirable to be able to control the value of the threshold voltage of such transistors. For this purpose it is recommended to use a suitable polarization of the crystal in which these transistors are incorporated, in particular by making use of a polarization circuit C.P. the structural details and manner of operation of which are illustrated in the present applicant's U.S. Pat. application Ser. No. 373,872 filed June 26, 1973 (Swiss priority No. 9644/72 of June 27, 1972), to which application reference may be had for further details.

We may simply state that the circuit C.P. which is controlled by the periodic signal delivered by the oscillator O-Q will be preferably developed in integrated form in the crystal in which the circuit O is integrated, which is true in the embodiment shown schematically in FIG. 1.

It could also be developed in a crystal other than that of the circuit O, in which case it would be advisable to connect the two crystals and the two respective zones M galvanically in suitable fashion.

The lines $x'$ and $y'$ which have already been mentioned are connected to homologous lines $x$ and $y$ by capacitors $C_x$ and $C_y$ the purpose of which will become evident subsequently, these lines $x$ and $y$ leading to a divider DIV which they make it possible to control by means of the symmetrical periodic signals coming from the signals delivered by the oscillator O-Q. These signals will vary between O and $-\phi_1$ in the case of the line $x$, and between O and $-\phi_2$ in the case of the line $y$ (while the corresponding signals varied between O and $\phi_1$ and O and $\phi_2$ on the lines $x'$ and $y'$ respectively) due to the presence of two field-effect transistors with insulated control electrode, $T_x$ and $T_y$, which are connected in series between the lines $x$ and $y$ and which are connected by their respective control electrode to the line $x$ in the case of the transistor $T_x$ and to the line $y$ in the case of the transistor $T_y$. Furthermore, these two transistors are connected to ground M at their common point, as is true of the divider DIV and the circuit O.

The components of the divider DIV are themselves also made in integrated form in the crystal $p^+$ in which the sustaining circuit O and the polarization circuit C.P. are integrated.

Before explaining why the assembly shown in the drawing has the numerous advantages which have already been mentioned, let us see what the special features of the divider circuit DIV are.

Figure 3:
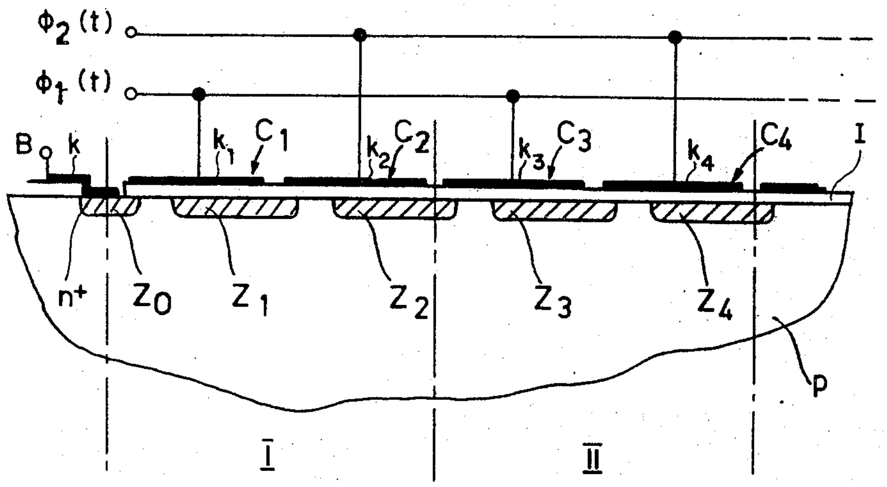
FIG. 3 is a schematic section on a very large scale of a part of a shift register of known type.

For this frequency divider, use is made in part of the principle of the so-called "Charge-Transfer Dynamic Shift Registers" (see for instance C.N. Berglund and R.J. Strain, Fabrication and Performance Considerations of Charge-Transfer Dynamic Shift Registers, Bell Syst. Techn. Journal Vol. 51 No. 3 March 1972). The two customary versions of these devices are the IGFET (Insulated Gate Field Effect Transistor), bucket brigade register and the CCD (Charge-Coupled Device). The principle of operation of these two devices being practically the same, the explanations which we are going to give as to the manner of producing a frequency divider by the use of this principle will make reference, by way of example, to the IGFET bucket brigade register. FIG. 3, in a semi-schematic showing, shows two links I and II of such a register, of known type.

This figure shows a crystal p in which five zones of type $n^+$, $z_0$ and $z_1$ to $z_4$ are integrated, all being covered by an insulating layer I interrupted locally over a part of the zone $z_0$ on which there rests a contact $k$, formed of a conductive deposit and forming an electrode intended to receive the signal to be transferred by the register. As can be seen, the electrode has a terminal B for this purpose.

This register, furthermore, has a plurality of other electrodes only the first four of which, $k_1$ to $k_4$, are visible in the drawing, each of them extending over the largest portion of the homologous zone in question ($k_1$ in the case of $z_1$, $k_2$ in the case of $z_2$, $k_3$ in the case of $z_3$ etc.) as well as above the terminal portion of the preceding zone in the increasing order of the numbering of these zones. The electrodes $k_1$, $k_2$, $k_3$ etc. are connected alternately to lines $x$ and $y$ fed by symmetrical alternating signals $-\phi_1$ $(t)$ and $-\phi_2$ $(t)$ respectively. Each electrode $k_1$, $k_2$ etc. constitutes on the one hand the gate of an insulated gate field effect transistor whose homologous zone $z$ would be the drain and the preceding zone $z$ the source, and, on the other hand, one of the plates of a capacitor ($C_1$ in the case of the electrode $k_1$; $C_2$ in the case of the electrode $k_2$ etc) the other plate of which is formed by the zone $z$ of subscript corresponding to the subscript of the electrode $k$ in question.

Thus the two links I and II of the register partially shown in FIG. 3 each comprise, on the one hand, two insulated gate field-effect transistors formed respectively of the elements $z_0$, $z_1$, $k_1$ and $z_1$, $z_2$, $k_2$ in the case of the link I and by the elements $z_2$, $z_3$, $k_3$, and $z_3$, $z_4$, $k_4$ in the case of the link II and, on the other hand, two capacitors $C_1$ and $C_2$ and $C_3$ and $C_4$ respectively for the links I and II respectively, each capacitor being in fact connected between the gate and the drain of the corresponding transistor.

The operation of such a register is very aptly described in the literature mentioned and will therefore not be repeated here. We may briefly note that if a pulse of suitable negative voltage with reference to the electrode $k$ is applied to the terminal B (zone $z_0$) the capacitor $C_1$ is charged by the transistor whose zone $z_1$ forms the drain and the zones $z_0$ the source. When the voltage $-\phi_1$ $(t)$ decreases and the voltage $-\phi_2$ $(t)$ increases, the charge present in the capacitor $C_1$ is transferred to the capacitor $C_2$ by the next transistor whose source is now formed by the zone $z_1$ and the drain by the zone $z_2$ and so on. After each period of the voltage $\phi_1$ $(t)$ or $\phi_2$ $(t)$ the charge is therefore transferred from one link to the next.

If the input of the system is controlled by the output charge thereof, for instnace very simply by connecting the register in the form of a ring, that is to say by connecting its output zone with its input zone, the passage of the charge at a given place takes place with a periodicity of $n$T in which T is the period of the voltage $\phi_1$ $(t)$ which is equal to that of $\phi_2$ $(t)$ and n the number of links used. If such a chain formed of n charge transfer elements is controlled by a symmetrical oscillator providing two periodic voltages of opposite phase, one has, in principle, a frequency divider which divides the frequency of the oscillator by $n$. However, in order to be able to use this principle, several problems must be solved. A first obstacle results from the fact that the entire charge after being introduced into a capacitor is not transferred to the following capacitor. After each transfer there is thus a certain loss of charge, which is equivalent to saying that the initial charge decreases as it is transferred from one link to the next; after a short period of time, the charge initially introduced into a capacitor is dispersed throughout the entire chain.

Furthermore, it is necessary at a certain point in the chain to have an output on which, at the time of passage of the charge, that a signal appears of such a nature that it can control another electronic circuit, such as for instance another frequency divider, designed to divide a lower frequency. This output must therefore be capable of being charged with the input impedance of the said electronic circuit without the operation of the charge transfer chain being disturbed. Furthermore, even if one succeeds in producing at said output a signal having an amplitude corresponding approximately to that of $\phi(t)$ and a duration equivalent to that of the passage of the charge in a link, that is to say a duration of a period T of said voltage $\phi(t)$ to be divided, the value of the amplitude of the fundamental component of the voltage of the frequency divided is decreased to an extent corresponding to the increase of $n$. Therefore, the device to the controlled must also be designed in such a manner that it can process signals of a frequency as high as that of the oscillator and do so also with minimum consumption; in such an assembly, a divider of this type would not offer any practical advantage.

It would be necessary for the high frequency divider to be able to supply a divided alternate voltage the amplitude of the fundamental component of which is large and for the device to be controlled by this divider to be capable for presenting an input capacitance which is high as compared with that of a link of this divider.

In order to describe the operation of such a circuit which makes it possible to solve this last mentioned requirement, let us assume, first of all, that we actually have a device capable of being introduced into the chain and having the following characteristics.

a. It returns the input charge supplied it to the initial value after it has passed through a certain number of links (and has accordingly been decreased somewhat) and transfers it to the following link (link connected to the output of said device), said charge continuing then to be displaced from one link to the next.

b. After the passage and regeneration of the charge, this device drains every charge carrier (in the case described, electrons) arriving at its input out of the chain until the arrival of a charge whose value exceeds a certain threshold; this charge will be regenerated and transferred as required to point $a$.) These charge carriers which are to be drained out of the circuit are those which are due to the incomplete transfers from one link to the other of the initial charge as well as those created by thermal excitation.

c. At a second output it supplies a voltage pulse of a duration equal to at least one half period of that of the control voltage $\phi_1(t)$ and $\phi_2(t)$ respectively of the divider formed by the chain, that is to say that of the output voltage of the oscillator in the case described. This pulse must be able to control at least a transistor or low input capacitance.

FIG. 4 shows very schematically, by way of example, a chain of charge transfer elements comprising $2n_1 + 2n_2$ links connected as a ring and controlled by the two voltages $-\phi_1(t)$ and $-\phi_2(t)$ in phase opposition which are supplied by a symmetrical oscillator Osc. for instance. In the drawing, only two links I and II of a section of $n_1$ links have been shown schematically, it being understood however that these links, in the same way furthermore as all the others, have a structure similar to that described with reference to FIG. 3.

In the drawing, the chain shown comprises furthermore four devices $D_I$, $D_{II}$, $D_{III}$, and $D_{IV}$ satisfying the requirements $a$, $b$ and $c$ described above.

The transfer of the charge, once it has been introduced into a capacitor of a link, takes place in the direction indicated by the arrows. Between the output $s_2$ of the device $D_{IV}$ and the input of the device $D_I$ there are $n_1$ links. The same is true between the devices $D_{II}$ and $D_{III}$. Between the devices $D_I$ $D_{II}$ as well as between $D_{III}$ and $D_{IV}$ there are $n_2$ links. Each device D therefore supplies at its output $s_2$ a short voltage pulse which is staggered in time with respect to the pulses supplied by the other devices D (see FIG. 5$a$).

As will be described below, the passage of the charge through a device D can take a time of half of a period T, corresponding to that necessary for the transfer of the charge through a half link. If the designate by $t_I$ and $t_{II}$, respectively, the time at which the signal at the output $S_2$ of the devices $D_I$ and $D_{II}$, respectively, etc. has its maximum value, the output signal of the device $D_{II}$ will be delayed with respect to that of the device $D_I$ by $(n_2 + ½)$ T, that of $D_{III}$ by $(n_1 + ½)$ to that of device $D_{II}$, etc.

The circuit shown in FIG. 6, which is controlled by the signals I to IV (FIGS. 5$a$) which are staggered in time, makes it possible to effect the desired transformation, that is to say, to produce from a very short amplitude of the fundamental component of the voltage of the divided frequency, a large amplitude making it possible to charge and discharge a capacitance of relatively high value, in particular that of a load circuit A.

This circuit comprises six IGFET transistors $T_1$, $T_2$, $T_3$, $T_4$, $T_5$ and $T_6$ which are connected in the following manner:

The transistors $T_2$ and $T_3$ are connected in series with a DC voltage source $V_p$ which is connected to ground M by its negative pole. The input $S_{2II}$ of the transistor $T_2$ is connected to the output $S_2$ of the device $D_{II}$, the input $S_{2III}$ of the transistor $T_3$ being connected to the output $S_2$ of the device $D_{III}$;

The transistors $T_1$ and $T_4$ are connected in series with the source $V_p$. Their inputs are connected respectively to the output $S_2$ of the devices $D_I$ and $D_{IV}$;

The transistors $T_5$ and $T_6$ are connected in series with the source $V_p$. The input of the transistor $T_5$ is connected to the junction point $b$ of the transistors $T_2$ and $T_3$. Likewise, the input of the transistor $T_6$ is connected to the junction point $c$ of the transistors $T_1$ and $T_4$. Furthermore, the aforementioned circuit A is connected to the common point $a$ of said transistors $T_5$ and $T_6$.

Finally, it will be pointed out, with respect to the transistor $T_5$, that its capacitance between its gate and the point a is less than the capacitance represented by the circuit A.

We furthermore note that in the case described, although the frequency of repetition of the pulses coming from the devices $D_I$ to $D_{IV}$ is far less than the control frequency of the chain, this first frequency is still rather high (of the order of 100 kHz or less) so that any effect due to inverse currents of the junctions can be neglected. All the transistors have narrow channels so as to present a low input capacitance. The transistors $T_5$ and $T_6$ will preferably have a small slope so that the sides of the pulse, appearing on the output *a* of the circuit and which are of relatively long duration are of relatively small incline. Each transistor, which is controlled by a short pulse coming from the devices D and which therefore contains essentially high frequency components must essentially charge or discharge the input capacitance of one of the transistors $T_5$ and $T_6$. These transistors, controlled by the short pulses, can therefore in their turn have a small slope; they therefore themselves present a small input capacitance and, therefore, a reduced capacitive charge for the devices D. This is important since it is this capacitive charge which essentially determines the dimensioning of the chain and accordingly its consumption.

The operation of this circuit may be described as follows.

Let us assume first of all that only the input capacitance of the transistor $T_6$ is charged. The voltage pulse coming from the device $D_I$ (see FIG. 5*a*) causes the discharge of the input capacitance of the transistor $T_6$ via the transistor $T_1$. Thereupon, since the capacitance of the circuit A is much higher than the input capacitance of the transistor $T_5$, it is essentially on the latter that a voltage will appear during the time that the charging of this capacitance and of that of the circuit A takes place across the transistor $T_2$ when the latter is controlled by the pulse coming from the device $D_{II}$. As from this moment, the transistor $T_5$ is and remains open. Therefore, the voltage rises at the point *a* up to the value of the voltage of the battery (see FIG. 5*b*). Due to the small ratio of the slope of the transistor $T_5$ to the input capacitance of the circuit A, this rise in voltage is relatively slow, which is desirable for a circuit A of lower frequency, particularly if there is concerned, for instnace, a so-called "capacitor pull up circuit" (see for instance Robert H. Crawford and Bernard Bazin: Theory and Design of MOS Capacitor Pull-up Circuits, IEEE Journal of Solid-State Circuits Vol. SC-4 No. 3, June 1969).

The pulse coming from the device $D_{III}$ will then, via the transistor $T_3$, discharge the capacitance which is presented by point *b:* the source of the transistor $T_5$ will then have a positive potential with respect to its gate and this transistor is therefore locked. If the charge which the circuit A presents is purely capacitive, the voltage remains on the point *a* until the appearance of the pulse coming from the device $D_{IV}$ which will then, via the transistor $T_4$, charge the input capacitance of the transistor $T_6$. This transistor opens and the capacitance which the circuit A presents is discharged relatively slowly by the transistor $T_6$ and the cycle can start again with the pulse coming from the device $D_1$. It is obvious that instead of being connected to ground M, the source of the transistor $T_3$ can also be connected to the point *a*. In this case, it is necessary, of course, that the control peak voltage of this transistor sufficiently exceed the voltage of the battery for the input capacitance of the transistor $T_5$ to be discharged. On the other hand, the state of charge of this input capacitance will never be reversed in this case.

We furthermore note that this circuit (FIG. 6) can easily be integrated in such a manner as to reduce any parasitic capacitance to the minimum.

There are various circuit solutions which satisfy the functions demanded of the device "D". One of these solutions will now be described with reference to FIGS. 7, 8 and 9.

In FIG. 7, there can be noted most of the parts already described with reference to FIG. 3. This FIG. 7 shows, as a matter of fact, three half-links of the chain constituting a register of the type shown in FIG. 4 and which are controlled, as described with reference to said last-mentioned FIG. 4 by symetrical periodic voltages $-\phi_1$ (*t*) and $-\phi_2$ (*t*) (lines *x* and *y*).

FIGS. 8 and 9 show the elements which are included in one of the devices $D_I$ to $D_{IV}$ already mentioned. In these figures, the zones $Z_2'$ and $Z_3'$ (FIGS. 8 and 9 respectively) are connected to the zones $Z_2$ and $Z_3$, respectively, shown in FIG. 7. It can furthermore be seen that each of these devices D furthermore has four other zones of type $n^+$ integrated in the crystal p, namely the zones $Z_Q$, $Z_a$ (FIG. 8), M (FIGS. 8 and 9) and $Z_b$ (FIG. 9) as well as a plurality of electrodes $q_1$ to $q_9$.

The electrodes $q_1$, $q_2$,$q_3$, $q_4$, $q_5$, $q_7$ and $q_8$ are placed on an insulating layer $I_o$ which is interrupted at the zone M, a part of the zone $Z_1$ and a part of the zones $Z_Q$ and $Z_a$ (FIGS. 8 and 9). The electrodes $q_4$ and $q_6$ are connected to each other by a connection $\alpha$; the electrodes $q_7$ and $q_8$ are both connected to the line *x* and therefore receive the signal $-\phi_1$ (*t*), while the electrodes $q_1$ and $q_5$ are connected to a line *y''* *and to the line y*, respectively, so that the former, $q_1$, receives a signal $-\phi_2'$ (see FIG. 10) and the second, $q_5$, receives the signal $-\phi_2$ (*t*). The electrode $q_9$ constitutes the output $S_2$ of the device D in question. Furthermore, the electrode $q_1$ forms, with a part of the zone $Z_2'$ and a part of the zone $Z_Q$ a field effect transistor $T_7$ with insulated gate ($q_1$) of which these zones constitute the source and the drain respectively.

The electrodes $q_2$ and $q_3$ which are galvanically connected to the zones $Z_a$ and M respectively, also form insulated gate field effect transistors $T_8$, in the case of the electrode $q_2$, and $T_9$, in the case of the electrode $q_3$, the source and the drain being formed of the zones $Z_Q$ and $Z_a$, respectively, in the case of the transistor $T_8$ and by the zones $Z_a$ and M, respectively, in the case of the transistor $T_9$.

Finally, the electrodes $q_4$ and $q_5$ constitute the gates of two other insulated gate field-effect transistors, $T_{10}$ and $T_{11}$, the source and the drain of which are formed by the zones M and $Z_b$, respectively, in the case of the transistor $T_{10}$, and by the zones $Z_b$ and $Z_3'$ in the case of the transistor $T_{11}$.

Zone M represents the common point of the assembly of the frequency divider comprising the closed chain and therefore also the devices D. It may also be that of the circuit of the FIG. 6 and of the circuits controlled by the latter. There is a great advantage in polarizing (biasing) this zone M positively with respect to the crystal *p* in the manner described in the applicant's U.S. Patent application Ser. No. 373,872 filed June 26, 1973 (Swiss priority No. 9644/72 of June 27, 1972).

In order to simplify the description of the operation of the circuit in question, let us assume that the threshold voltage of the transistors is practically equal to 0 and that the potential on the conductors *x* and *y* varies with respect to the potential of the zone M between practically 0 and a certain negative value $-\phi_1$ or $-\phi_2$, respectively, as shown in FIG. 10. Assuming the capacitances of the zones Z with respect to the crystal $p$, negligible, as compared with those of the capacitors whose dielectric consists of the insulating layer I or $I_o$, there are obtained on these zones variations in potential similar to those appearing on the conductors $x$ and $y$, but ranging between substantially 0 and $+\phi_1$ and $+\phi_2$, respectively. This, of course, is the case in state of equilibrium, that is to say, at the places where substantially no charge is transferred from one zone to the other. In the state of equilibrium, and since the gate of the transistor $T_9$ (FIG. 8) is connected to the zone M, there is established on the zone $Z_a$ a variation of potential between 0 and $+\phi_1$. Since the gate of the transistor $T_8$ is connected to the zone $Z_a$, a continuous voltage of value $+\phi_1$ with respect to ground M is established on the zone $Z_Q$. The transistor $T_7$ is controlled by a voltage $-\phi_2'$ (FIG. 10) having the same shape as that present on the conductor $y$ but of much lower amplitude, which voltage can be obtained from the conductor $y'$ by a circuit similar to that established by the capacitor $C_y$ and the transistor $T_y$ (see FIG. 1).

In a variant, not shown, it would also be possible to connect the electrode $q_1$ of the transistor $T_7$ to the ground M.

In the state of equilibrium, this transistor is therefore always practically blocked.

Once a negative charge of small value has arrived on the zone $Z_2$ and therefore also on $Z'_2$, and at the moment when the voltage on the conductor $x$ approaches its maximum negative value, this charge, which is formed by electrons, passes essentially through the transistor $T_7$ since the gate of the latter has, at this time, a lower negative voltage with respect to the ground "M" than that of the transistor formed by the zones $Z_2$ and $Z_3$ and by the electrode $k_3$ (FIGS. 3 and 7). This charge, therefore, passes over the zone $Z_Q$ and momentarily lowers somewhat the positive potential thereof. When the potential on the zone $Z_a$ passes through its positive maximum, the said charge passes, via the transistor $T_8$ from zone $Z_Q$ to zone $Z_a$ and when the potential of the zone $Z_a$ passes through its minimum, the latter becomes slightly negative with respect to ground due to the charge of electrons. This charge of electrons finally, therefore, passes through the transistor $T_9$ to ground M. It is therefore seen that the part of the circuit shown in FIG. 8 serves to drain the residual electrons to an incomplete transfer of the initial charge which has passed through the links which precede the zone $Z_2$ or which are created by thermal excitation in the said links.

If a charge of a much greater value, for instance, the initial charge introduced into the chain by the terminal B (FIG. 3) arrives on Zone $Z_2$, a larger charge passes — via the process described — to the zone $Z_Q$, the positive potential of which zone not only becomes slightly decreased but becomes negative with respect to the ground M. A part of the charge received passes from the zone $Z_2$ to the zone $Z_3$, via the transistor formed by these two zones and its gate $k_3$, which is connected to the conductor y.

As indicated in FIGS. 8 and 9, the zone $Z_Q$ is connected to the gate of the transistor $T_{10}$. In the state of equilibrium during which the zone $Z_Q$ has a continuous positive potential with respect to M, the transistor $T_{10}$ is open, the potential on the zone $Z_b$ remains substantially equal to O and a capacitor $C_b$ which is formed by $Z_b$, the insulating layer $I_0$ and the electrode $q_8$ is charged and discharged via a current passing through this transistor $T_{10}$.

When the potential of the zone $Z_Q$ becomes strongly negative with respect to M, this transistor $T_{10}$ is blocked. At this moment, the capacitor $C_b$ is practically entirely charged (the voltage $\phi_1(t)$ is practically at its peak value). When this voltage $\phi_1(t)$ decreases, the potential of the zone $Z_b$ becomes negative and when it reaches a certain value, electrons are transferred by the transistor $T_{11}$ to the zone $Z'_3$ (which is part of the zone $Z_3$ — FIG. 7) and regenerate the degraded charge which has just been transferred from the zone $Z_2$ to $Z_3$ in order to return the value thereof to its initial value. Throughout the process described, the potential with respect to M on zone $Z_b$, and therefore on the output $S_2$ of the corresponding device D, develops with time in the manner shown in FIG. 11. The rise towards positive values of this potential takes place upon the rise of the voltage $\phi_1(t)$, while the two transistors $T_{10}$ and $T_{11}$ (FIG. 9) are blocked. The potential on the zone $Z_b$ becomes zero again and remains zero when the potential on the zone $Z_Q$ has become positive and therefore causes the opening of the transistor $T_{10}$.

The shape of the signal shown in FIG. 11 is such that this signal lends itself very well to control one of the transistors $T_1$ to $T_4$ of the circuit of FIG. 6.

A signal having the shape of the one shown as FIG. 13 can also be obtained by using an additional circuit the features of which can be noted from FIG. 12. This circuit comprises, on the one hand, a field-effect transistor $T_{12}$ with insulated gate $q_{10}$, whose drain is formed of an $n^+$ zone ($Z_c$) and the source of which is formed by the zone M already mentioned and, on the other hand, by a capacitor formed, first of all, by an electrode $q_{11}$ extending above the central portion of the zone $Z_c$ and insulated from the latter by a layer $I_2$, said electrode being connected to the line $y$ and, secondly, by the zone $Z_c$ in direct contact with an electrode $q_{12}$ constituting the output $S_2$ of the corresponding device D. The electrode $q_{10}$ of the transistor $T_{12}$ is connected by the conductor $\alpha$ to the zone $Z_Q$.

As results from what has just been stated, the link $Z_2 - Z_3$ (FIG. 7) is, in fact, part of the composite circuit shown in FIGS. 8 and 9, all thus forming a device D which satisfies all the requirements previously set forth under points $a$, $b$ and $c$. We note that the closed chain containing the devices D (FIG. 4) is both controlled and fed by the oscillator while from the circuit of FIG. 6, which is itself controlled only by the outputs $S_2$ of the devices D, the circuits are fed by the battery $V_p$.

When the assembly described with reference to FIG. 1 and the following figures is turned on, that is to say, when it is connected to the battery P, all the electrons present initially in the chain of the shift register must be drained out of said chain by means of a drainage circuit, the structure of which could be that of a circuit of the type shown in FIG. 8. It is then necessary, for instance, by means of an auxiliary circuit, to charge an output capacitor of a device D (for instance, the capacitor $C_3$ in FIG. 7), when the voltage on the line $y$ approaches its maximum value.

By way of example, this initial charge can be introduced by means of an insulated gate field-effect transistor whose drain is part of the zones $Z_3$ and the source of the zone M and whose gate will always be biased strongly negatively with respect to M. For the period of time necessary for the introduction of the charge, this gate will be biased positively with respect to M. It is therefore necessary also to have a starting circuit which, while controlling the said drainage circuit, imparts to the gate of said transistor after a certain period of time, a single positive pulse in synchronism with the voltage $\phi_2$ ($t$). This auxiliary circuit, which is placed in operation upon the starting of the oscillator-divider described thus only for a very short period of time can, therefore, itself have a relatively high consumption. As a result, it is possible to contemplate a very large number of solutions by making use of known means or employing manufacturing techniques identical to those necessary for the construction of the circuits described.

Furthermore, let us note that in principle, the divider constituted by the chain of the shift register presents an average impedance which is very stable in time for the oscillator. This impedance varies slightly upon the passage of the charge in a device D which has a momentary but specific influence on the phase of the voltage of the oscillator. In other words, during a period of the divided frequency, the frequency of the oscillator may vary very slightly in a well-determined manner. In practice, there are concerned relative variations of the frequency of the order of a few $10^{-6}$. The oscillator-divider assembly described is therefore not contemplated as instrument of very high precision serving to measure very short times but exclusively for applications in which there is required a very high precision of the average frequency of the oscillator with an extremely low consumption.

As already mentioned, it is particularly recommended to bias the zone M, which represents the ground of the system positively with respect to the crystal $p$. This biasing can be effected advantageously by making use of the circuits described in the U.S. Pat. application Ser. No. 373,872, filed June 26, 1973 (priority of Swiss Application No 9644/72 of June 27, 1972). In this case, the biasing circuit will be controlled by the two sinusoidal voltages in phase opposition delivered by the symetrical oscillator, as has already been described in said patent application.

Although reference has been had in the above description only to a frequency divider formed of a shift register comprising four devices $D_I$, $D_{II}$, $D_{III}$, $D_{IV}$, it is obvious that such a divider could also comprise, in accordance with one variant, only two devices D, it being understood that in such case the transistor $T_1$ and $T_2$ of the circuits shown in FIG. 6 will be controlled by the signal coming from the first device D and the transistors $T_3$ $T_4$ by the signal coming from the second device D.

Furthermore, it may be pointed out that in accordance with the oscillator circuit used, a DC potential can be superimposed on the voltage $\phi_1$ ($t$) and $\phi_2$ ($t$). This latter potential is without importance since the conductors $x'$ and $y'$ are separated from the divider DIV by capacitors $C_x$ and $C_y$, respectively, and by capacitors whose dielectric is an oxide film from the canal which drains the electrons out of the zone M via the biasing circuit C.P.

Figure 2:
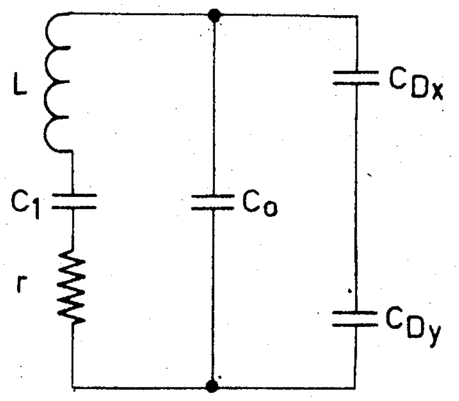
FIG. 2 shows the equivalent circuit of the quartz of the oscillator forming part of the assembly shown in FIG. 1 and of the capacitive charge of said quartz.

Let us now refer to FIGS. 1 and 2 of the accompanying drawings to illustrate the advantages mentioned within the scope of the following example:

The resonator Q connected to the sustaining circuit O is a quartz of AT cut having a natural frequency of 3 megacycles. If this quartz is made in the form of a plano-convex disc having a diameter of about 6 mm, one can for instance, obtain the following values for its characteristics which are of interest in the present case:

Dynamic capacitance: $C_1 = 3.10^{-3}$ pF
Static capacitance: $C_o \approx 0.5$ pF
Series resistance: $r \approx 100\ \Omega$ The equivalent circuit of the quartz with its charge which the divider circuit presents for it is shown in simplified manner in FIG. 2.

The capacitor $C_{DX}$ represents the capacitance of the conductor $x$, with everything connected to it, with respect to the crystal $p$, that is to say, with respect to the ground M, since the capacitance which the zone M presents with respect to the crystal $p$ is relatively large. The capacitor $C_{Dy}$ represents the capacitance of the conductor $y$, with everything connected to it, with reference to the crystal $p$. Since the value of the capacitance of the capacitors $C_x$ and $C_y$ (FIG. 1) is normally selected much larger than that which the capacitors $C_{Dx}$ and $C_{Dy}$ respectively, have, the mere effect thereof can be neglected. Furthermore, one can neglect the very small capacitance of the biasing circuit C.P. (FIG. 1).

The entire current which passes through $C_o$, $C_{Dx}$ and $C_{Dy}$ via the capacitance which the oscillator circuit presents and via the parasitic capacitance which the quartz electrodes present with respect to the housing in which it is mounted, must pass through the equivalent resistance $r$ of the quartz. If it is desired, for instance, to assume a loss of 0.5 $\mu$W in the latter, the total reactive current permissible is 70 $\mu$ Amps. If one uses a battery of 1.3 volts and produces a peak to peak voltage on the conductors $x'$ and $y'$ respectively of 2.6 volts, the effective voltage on the quartz is 1.8 volts, which makes it possible to have a value of 2pF for the parallel total capacitance. If the integrated circuit is encapsulated in the same housing as that in which the quartz is mounted, as is for instance true in the case of the circuit proposed in the applicant's U.S. Pat. application Ser. No. 3,796,968 (priority of Swiss application No. 4091/72), the parasitic capacitance can be maintained at an extremely low value so that there remains about 1pF for the series capacitance $C_{Dx}/C_{Dy}$, that is to say about 2pF for each capacitance $C_{Dx}$ and $C_{Dy}$ respectively. This capacitance has a large value available to dimension the integrated divider described, particularly as the latter is highly biased with respect to the crystal. With the present technology, this fact makes it possible to produce a divider having a division rate of at least 30, while dissipating a power of the order of 1 $\mu$W, which power is dissipated upon the transfer of the charge from one length of the register to the other. We may note that upon the passage of the charge in the devices D, a certain amount of power is also dissipated in these devices. However, even in the event that this power is of the same order as that necessary for the normal transfer of the charge from one link to the other, the average power would be $x/n$ times the power necessary for the transfer ($x$ = number of devices D in the chain, $n$ = division rate of the divider) and therefore practically negligible for a high division factor. If one assumes an efficiency of the oscillator circuit of 70%, the consumption of the oscillator-divider assembly is then only about 1.5 $\mu$ Amp. In many cases, it is of course not necessary to have so low a consumption. One can then increase the dimensions of the integrated circuit in such a manner that its manufacture becomes even more economical.

Finally, it should be pointed out that it is advantageous for the control voltage of the transistor $T_{11}$ (FIG. 9) to be slightly less than the voltages $-\phi_1$ and $-\phi_2$, respectively, which appear on the conductors *x* and *y*.

As a matter of fact, if the charge transferred by the transistor $T_{11}$ (FIG. 9) is too large to be able to be transferred entirely thereupon from zone $Z_3$ to zone $Z_4$ (FIG. 7), the excess charge returns, via this transistor $T_{11}$, to the zone $Z_b$ and from there to the ground M via the transistor $T_{10}$ (FIG. 9). It is also not necessary for the charge transferred from one link to the other to have so large a value, that is to say, it is not necessary that the capacitors which are formed by the zones $Z_1$, $Z_2$, etc., with their counter electrodes be fully charged when the voltage on said capacitors arrives at its maximum value.

We may also note that, in accordance with the procedure described with reference to FIGS. 8 and 9, it is clear that the gate of the transistor $T_9$ (FIG. 8) can also be connected directly to the conductor *y* instead of being connected to the ground M.

I claim:

1. Assembly comprising a quartz oscillator delivering two-phased periodic signals and a divider for the frequency of said signals, characterized by the fact that the divider is formed of a shift register which is in integrated form and comprises a plurality of links connected one behind the other, the first of which is arranged behind the last so as to form a closed loop, these links being controlled by the said oscillator alternately from both ends thereof, by the fact that the oscillator and the register are coupled to each other in such a manner that the capacitive charge associated with the input capacitance of the register constitutes a part of the capacitive charge of the said oscillator, and finally by the fact that it comprises, arranged at least at one point of said closed loop, means to form a characteristic signal of the passage at said point of any electric charge whose value is at least equal to a predetermined lower value, means for increasing the value of such a charge up to a ceiling value, and means for removing from said endless loop any charge whose value does not reach said predetermined lower value, the said assembly comprising furthermore means for biasing the crystal in which the components of the said register are integrated.

2. Assembly according to claim 1 characterized by the fact that the electronic components of the circuit of the oscillator, of the shift register, and of the assembly of the said means, are integrated in one and the same crystal, these components being formed exclusively by insulated gate field effect transistors of the same type, and by capacitors.

* * * * *